United States Patent [19]
Lonergan et al.

[11] Patent Number: 5,989,603
[45] Date of Patent: Nov. 23, 1999

[54] EMULSION GLAZE FOR DOUGH PRODUCTS

[75] Inventors: Dennis Lonergan, Medina; Michelle Larsen, Woodbury, both of Minn.

[73] Assignee: The Pillsbury Company, Minneapolis, Minn.

[21] Appl. No.: 08/782,461

[22] Filed: Jan. 10, 1997

[51] Int. Cl.$^6$ ................................................ A21D 13/00
[52] U.S. Cl. ........................... 426/94; 426/262; 426/268; 426/302; 426/549; 426/602; 426/601; 426/446; 426/653; 426/496
[58] Field of Search ................................. 426/302, 549, 426/601, 573, 578, 275, 94, 100, 602, 262, 268, 446, 653, 496

[56] References Cited

U.S. PATENT DOCUMENTS

| | | | |
|---|---|---|---|
| 3,253,928 | 5/1966 | Bedenk et al. | 99/139 |
| 3,845,219 | 10/1974 | Federico | 426/19 |
| 4,046,920 | 9/1977 | Moline | 426/19 |
| 4,066,786 | 1/1978 | McKee | 426/302 |
| 4,066,796 | 1/1978 | McKee | 426/302 |
| 4,170,659 | 10/1979 | Totino et al. | 426/95 |
| 4,762,721 | 8/1988 | Holscher et al. | 426/94 |
| 5,202,138 | 4/1993 | Stypula | 426/94 |
| 5,260,076 | 11/1993 | Furcsik et al. | 427/21 |
| 5,492,707 | 2/1996 | Chalupa et al. | 426/302 |

FOREIGN PATENT DOCUMENTS

| | | | |
|---|---|---|---|
| 0 749 690 | 12/1996 | European Pat. Off. | A21D 6/00 |
| 58009643 | 1/1983 | Japan | A21D 8/00 |
| 85029458 | 7/1985 | Japan | A21D 8/00 |
| 4023944 | 1/1992 | Japan | A21D 13/00 |
| 4063538 | 2/1992 | Japan | A21D 2/32 |
| 8501283 | of 1986 | Netherlands . | |
| WO 8809618 | 12/1988 | WIPO | A21D 13/00 |

OTHER PUBLICATIONS

Food Chemistry, Second Edition, Revised and Expanded, Edited by Owen R. Fennema, Marcel Dekker, Inc. (1985), pp. 817–819.

Greenstein, *Secrets of a Jewish Baker: Authentic Jewish Rye and Other Breads*, The Crossing Press, Freedom, CA, pp. 112–115 (1993).

Beard, *Beard on Bread*, Ballantine Books, NY, pp. 52–54, 183–186, 189–190 (1973).

*Primary Examiner*—Paula K. Hutzell
*Assistant Examiner*—Eliane Lazar-Wesley
*Attorney, Agent, or Firm*—Faegre & Benson

[57] ABSTRACT

Shaped, unbaked dough products are provided that are coated with a glaze comprising an amount of water, oil and a hydrophilic colloid. The application of the glaze to the dough products, followed by baking, mimics the frying step which is traditionally used in the production process of certain dough products.

34 Claims, 1 Drawing Sheet

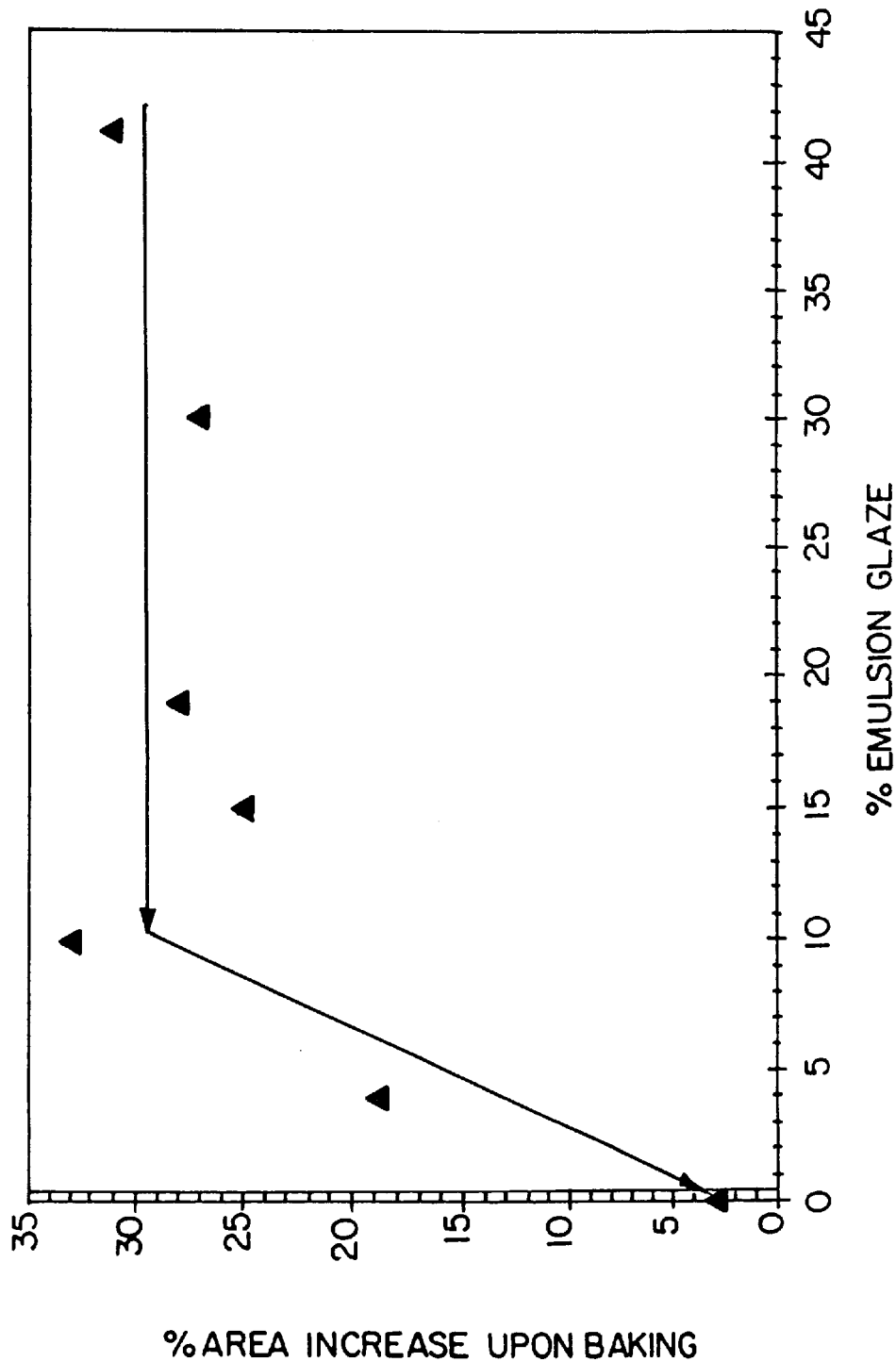

EMULSION GLAZE FOR DOUGH PRODUCTS

BACKGROUND OF THE INVENTION

Although health professionals recommend that an individual should derive only about 30% or less of their caloric intake from fat, Americans' attraction to fried foods continues. One indication of the undying popularity of fried foods is their persistence on restaurant menus across the country. Culinary professionals do try to prepare fried foods as healthfully as possible, typically using vegetable, canola, or peanut oil. Additionally, many restaurants now supplement their menus with such items as flash-fried seafood or vegetables lightly dusted with flavorful coatings, which are perceived to be more healthful than battered and breaded items which absorb fat.

Statistics from a recent National Restaurant Association survey support the trend away from fried food. Sixty-nine percent of restaurant patrons said they strongly preferred broiled items to fried menu items, up from 52% who expressed this attitude in the mid-1980s. Four out of ten restaurant patrons strongly agreed with the statement that "fried foods are bad for you." For every consumer favoring deep-fried seafood and poultry menu items, twice as many said they would like to try these items broiled or grilled. Even so, a recent survey indicates that interest in nutrition has peaked, and fried foods are regaining their popularity.

Fried items are not likely to disappear from restaurant menus in the near future, because patrons find their taste appealing. Furthermore, fried foods are not typically prepared in the home as it is difficult to duplicate the taste and texture of fried foods in home kitchens. To date, the frozen breaded foods available in grocery stores have not provided a viable alternative to fresh fried items, since they are not comparable in quality to their restaurant counterparts.

In an attempt to address this need, U.S. Pat. No. 5,492,707, issued to Chalupa et al., claims the use of a batter comprising water, flour, dextrose, non-fat milk solids, sodium salt, calcium salt and gellan gum to coat a food product (such as chicken, fish, cheese, or vegetables) and baking the product to produce a food product disclosed to have a fried texture. The patent also claims a process for preparing coated baked dough food which comprises coating a baked dough food with a solution comprising water, gellan gum, calcium salt and sodium salt and drying the coated baked dough food. This claim is exemplified by Examples 3 and 4 which describe the preparation of bread crumbs which may subsequently be used as a coating to "enhance crispness and reduce the oil absorption of fried foods. Specifically, Example 3 discloses the incorporation of a gellan gum into a bread dough recipe and the formation of bread crumbs from the resulting baked loaf of bread. Example 4 discloses that the desired bread crumbs may be obtained by coating bread crumbs with a gellan gum solution and then drying the crumbs.

Thus, there is a need to provide a healthful alternative method of producing foods with the organoleptic qualities imparted by frying.

SUMMARY OF THE INVENTION

The present invention provides a shaped, unbaked, dough product coated on at least the upper surface thereof with a glaze that is effective to impart a fried surface texture to said product when it is baked. Preferably, the glaze comprises from about 20 to about 90% water, from about 10 to about 80% edible oil, and from about 0.1% to about 15% of an edible hydrophilic colloid. It is preferred that the glaze be applied in an amount of from about 1 to about 25% of the weight of the unbaked dough product, more preferably, the glaze is applied in an amount that is from about 3 to about 10% of the weight of the dough product.

It is preferred that the glaze has a viscosity of from about 1,000 to about 100,000 centipoise, measured at 20° C. on a Brookfield viscometer (model RVTD) at 5 rpm with a spindle size of 1–6, depending on the viscosity of the glaze. In this regard, the hydrophilic colloid utilized may be any edible hydrophilic colloid that is capable of producing a glaze that is within this viscosity range when present in the aforementioned amount with the water and edible oil. Preferably, the hydrophilic colloid is selected from the group consisting of a starch (including pre-gelatinized starch and chemically-modified starch), a natural gum, a chemically-modified polysaccharide, and mixtures thereof. More preferably, the hydrophilic colloid is pre-gelatinized starch.

Optionally, the glaze may comprise an amount of an emulsifier, such as sodium stearoyl lactylate, effective to promote the formation of an oil-in-water emulsion. If an emulsifier is to be included in the glaze, it is preferred that it be present in an amount of from about 0.1 to about 2% by weight of the glaze. The glaze may further optionally comprise an amount of a reducing sugar effective to provide a golden brown color to the final baked product. Preferably, the reducing sugar is maltose, isomaltose, cellobiose, lactose, melibiose, gentiobiose, rutinose, fructose, dextrose or a mixture thereof. More preferably, the reducing sugar is dextrose. If a reducing sugar is to be included in the glaze, it is preferred that it be present in an amount of from about 0.1 to about 5% by weight of the glaze.

Applicants have made the surprising discovery that the application of the aforementioned glaze to dough products, followed by baking, mimics the frying step which is traditionally used in the production process of certain dough products. For example, utilizing the aforementioned glaze in combination with baking, the frying step heretofore required in the production of finished pizza crusts can be eliminated. Thus, the present invention provides a method to impart a fried texture to dough products that are baked, without a frying step. For example, utilizing the method of the present invention, the desired fried texture and taste of a product such as a pizza crust or tortilla can be achieved without the frying step.

This particular embodiment of the invention provides the advantage that unbaked dough products, when coated with the glaze of the present invention, may be prepared in final form by any bakery, restaurant or individual consumer with a conventional oven.

The dimensions, or product geometry, of a baked dough product are related to the dimensions of the raw dough product. Traditionally, to obtain a baked product with a desired specific volume or geometry, the dough would have to obtain a certain geometry just prior to baking. Application of the glaze of the present invention to dough products prior to baking unexpectedly can increase the horizontal dimensions of the baked dough product over that which would be expected based on the dimensions of the dough product before baking. Thus, a method is provided to increase the horizontal dimensions of a dough product over the horizontal dimensions of a corresponding unglazed dough product, by coating an unbaked dough product with the aforementioned glaze, and baking the dough product.

Therefore, the unbaked dough product of the present invention may be any unbaked dough product to which it is desirable to impart a fried texture without a frying step, and/or where it is desirable to increase the horizontal dimensions over the dimensions normally attainable from baking the unglazed raw dough. For example, the dough product may be a pizza crust, a pizza roll, a pizza or sandwich pocket, a doughnut, a beignet, a tortilla, focaccia bread, a bunuelo, a crumpet and the like. Furthermore, the dough product may be frozen, refrigerated, or fresh.

It is contemplated that the glaze of the present invention will also be effective to increase other dimensions and/or the overall baked product geometry of unbaked dough products upon baking. That is, it is expected that, utilizing the glaze of the present invention, the height, baked specific volume or cross-sectional area of the baked product can also be increased over that which would be attainable from the corresponding unglazed dough product.

All percentages are by weight (wt %) unless otherwise indicated.

BRIEF DESCRIPTION OF THE FIGURES

FIG. 1 is a graph depicting the effect of the application of different quantities of the glaze of the present invention to pizza crusts that are subsequently baked.

DETAILED DESCRIPTION OF THE INVENTION

A. Unbaked Dough Products

As discussed hereinabove, unbaked dough products suitable for use as starting materials in the present invention include any dough product wherein it is desirable to achieve organoleptic properties, including taste and texture, that heretofore have required that the dough product be fried. Furthermore, unbaked dough products suitable for use in the present invention also include any dough products wherein it is desirable to produce finished products with increased horizontal dimensions over the dimensions which would normally be achievable from baking the unglazed raw dough dimensions. Furthermore, the dough product may be frozen (i.e. below 25° F.), refrigerated (i.e., from about 35° to about 40° F.), or fresh (at ambient temperature), prior to baking.

Formulations of each of the above listed unbaked dough products are well known to those of skill in the art, and are readily available to the public in commercial cookbooks. For example, Beard on Bread, incorporated herein by reference, contains at least one exemplary formulation for many of the above listed dough products. Beard, Beard on Bread, Ballantine Books, N.Y. (1973). An exemplary formulation for pizza crusts is disclosed in Example 2, hereinbelow. An exemplary formulation for focaccia can be found in Greenstein, Secrets of a Jewish Baker: Authentic Jewish Rye and Other Breads, The Crossing Press, Freedom, Calif., pp 112–115, (1993), incorporated herein by reference. An exemplary formulation for beignets can be found in Collin, The New Orleans Cookbook, Alfred A. Knopf, Inc., p 200, (1979), incorporated herein by reference.

Generally, the unbaked dough products suitable for use in the present invention are composed with the usual ingredients known to those of skill in the art, e.g., flour, water, yeast and salt. In addition to these basic ingredients, the dough products of the present invention may contain sugar, non-fat milk solids, shortening, gums, surfactants and film-forming proteins. The dough products may further comprise effective amounts of adjuvants such as flavorings, thickeners (e.g., starches and hydrophilic colloids), nutrients (e.g., carbohydrates, proteins, lipids, etc. ), antioxidants, antimicrobial agents, eggs and egg solids, acidulants, dough conditioners and enzymes, emulsifiers such as mono- and diglycerides, sodium stearoyl lactylate, vitamins, and the like.

Non-fat milk solids which can be used in the compositions of this invention are the solids of skim milk and include proteins, mineral matter and milk sugar. Other proteins such as casein, sodium caseinate, calcium caseinate, modified casein, sweet dairy whey, modified whey, and whey protein concentrate can also be used in these doughs.

Dry or liquid flavoring agents, fruit and vegetables may also be added to the formulation. These include mustard, potatoes, anchovies, capers, olives, bacon, cocoa, vanilla, chocolate, butter flavor, coconut, peppermint, pineapple, cherry, nuts, spices, salts, poppy or sesame seeds, onion, garlic, cheese, tomatoes, scallions, oat bran, jalapeno peppers, cinnamon, raisins, chocolate chips, apples, berries, bananas, walnuts, lemon and flavor enhancers, among others.

Acidulants commonly added to foods include lactic acid, citric acid, tartaric acid, malic acid, acetic acid, phosphoric acid, and hydrochloric acid.

Dough conditioners commonly added to dough products include potassium sorbate, L-cysteine hydrochloride, mono- and diglycerides, polysorbates, sodium bisulfite, sodium stearoyl lactylate, ascorbic acid and diacetyltartaric acid esters of mono- and di-glycerides (DATEM). These conditioners serve to add functionality, reduce mix times and provide softness to the doughs to which they are added.

The mixing times, temperatures and speeds for processing the dough product are known in conventional dough processing technology, but may vary depending on the particular product being prepared. Particular mixing times, temperatures and speeds for particular dough products can be readily determined by one skilled in the art using conventional processing technology.

B. The Glaze

The glaze of the present invention comprises water, one or more edible oils, and an edible hydrophilic colloid. Specifically, it is preferred that the glaze contain from about 20 to about 90% water, from about 10 to about 80% edible oil, from about 0.1% to about 15% of an edible hydrophilic colloid and optionally, a suitable emulsifier.

The glaze may further optionally comprise an amount of a reducing sugar effective to provide a golden brown color to the final baked product. Reducing sugars useful in the practice of the present invention include, but are not limited to, maltose, isomaltose, cellobiose, lactose, melibiose, gentiobiose, rutinose, fructose and dextrose. Preferably, the reducing sugar is dextrose. If a reducing sugar is to be included in the glaze, it is preferred that it be present in an amount of from about 0.1 to about 5% by weight of the glaze.

The particular edible oil or combination of edible oils utilized in the practice of the present invention is not critical. Instead, the oil or combination of oils to be used can be chosen on the basis of convenience and desired flavor. For example, edible oils suitable for use in the present invention include plant derived oils such as olive oil, canola oil, sunflower seed oil, safflower seed oil, corn oil, peanut oil, walnut oil, soy oil, and the like.

Furthermore, in addition to incorporating dry or liquid flavoring agents into the dough product, flavoring agents may also be added to the glaze. For example, the glaze may further comprise spices, salts, garlic, cheeses, oat bran, cinnamon, cornmeal, lemon, coconut, orange, cherry, butter or butter flavor and flavor enhancers, among others.

Hydrophilic colloids suitable for use in the present glazes are those capable of producing glazes of the recited viscosity and functionality. For example, known hydrophilic colloids which are suitable for use in the present invention include, but are not limited to, starches (including pre-gelatinized starch and chemically-modified starch), natural gums, chemically-modified natural polysaccharides, e.g., modified cellulose and mixtures thereof.

1. Starch

Starch is a high molecular weight carbohydrate of the general formula $(C_6H_{10}O_5)_n$. Starch granules exhibit a structure of concentric sheets which contain an elutable amylose fraction in the inner layers and an amylopectin fraction in the outer layers. As used herein, the term "starch" includes raw starch, pre-gelatinized starch and chemically-modified starch. When starch granules are contacted with water and heated above a temperature designated as the gel point, the granules begin to bind water and swell. The gel temperature for a particular starch variety depends on a number of factors, including particle size, pH and absolute concentration. If the weight ratio of starch to water is high enough, the effect of exceeding the gel temperature will be to gel substantially all of the water into a thick paste.

Starches useful in the present glaze may be selected from any of a wide variety of commercially available products including but not limited to, barley, corn, potato, wheat, rice, waxy maize, sago, sorghum, arrowroot, tapioca or mixtures thereof. These raw starches typically have granules sized within the range of about 2–150 microns, as measured along the longest axis, and exhibit gel temperatures of about 55° to 80° C. Since these starches can bind about 60–100% of their weight in water, for most glazing applications, useful amounts of the pre-gelatinized starch will fall within the range of about 1–15%, preferably about 2–10% and most preferably about 3–7% of the total weight of the glaze.

2. Other Hydrophilic Colloids

The hydrophilic colloid may also be a natural gum. For example, the hydrophilic colloid may be xanthan gum, carrageenan, gum tragacanth, locust bean gum, guar gum, algin, alginate, gelatin, Irish moss, pectin, gum arabic, gum ghatti, gum karaya and plant hemicelluloses, e.g. corn hull gum.

Additionally, the hydrophilic colloid may comprise a chemically-modified polysaccharide, such as a modified cellulose, prepared by partial hydrolysis of natural cellulose and subsequent chemical modification by etherification, carboxymethylation, or similar reaction. Examples of chemically-modified polysaccharides useful in the present invention include, but are not limited to methylcellulose, ethylcellulose, methyl ethyl cellulose, 2-hydroxyethyl ethylcellulose, 2-hydroxyethyl methylcellulose, 2-hydroxypropylcellulose, 2-hydroxypropymethylcellulose, hydroxyethycellulose and similar synthetic cellulose ethers. Other suitable chemically-modified polysaccharides include such ionic alkylcellulose ethers are carboxymethyl cellulose, carboxymethyl ethyl cellulose, carboxymethyl hydroxyethyl cellulose and their water-soluble salts. The term "chemically-modified polysaccharide" as used herein also refers to semi-synthetic hydrocolloids such as hydroxypropyl alginates and hydroxypropyl starch.

Optionally, the glaze may comprise an amount of an emulsifier, such as sodium stearoyl lactylate, effective in promoting the formation of an oil-in-water emulsion. If an emulsifier is to be included in the glaze, it is preferred that it be present in an amount of from about 0.1 to about 2% by weight of the dough product.

The glaze may further optionally comprise an amount of a reducing sugar, such as dextrose, effective to enhance the golden brown color of the final baked product. If a reducing sugar is to be included in the glaze, it is preferred that it be present in an amount of from about 1 to about 5% by weight of the glaze.

3. Glaze Viscosity

The ability of the glaze to impart a fried texture and/or to provide the enhanced baked product geometry depends upon the thickness of the glaze applied to the unbaked product, which is, in turn, dependent upon the viscosity of the glaze. Specifically, a glaze having a viscosity of 1,000 to about 100,000 centipoise (20° C., 5 rpm, spindle size from 1–6, Brookfield viscometer model RVTD) applied to the surface of the unbaked dough product in an amount from about 1 g to about 25 g per 100 g of dough product, adheres adequately to the unbaked dough product and produces a baked product with the desired organoleptic characteristics.

C. Method of Producing Baked Goods with Fried Characteristics and Enhanced Baked Product Geometry It is believed that it is the preselected viscosity of the glaze that retains the oil component of the glaze on the surface of the dough product. Specifically, the glaze of the present invention is of a sufficient viscosity to retain the oil at the surface of the dough during baking. Thus, the glaze of the present invention mimics the effects of frying during baking by maintaining excess heated oil on the surface of the dough product during baking, so that the crust effectively "fries" in the oven, and produces a baked product with a fried organoleptic quality, which mimics the taste and texture of fresh fried products.

Applicants have discovered that, simply by glazing a dough product prior to baking, the proper taste, texture, final baked product geometry and specific volume can be achieved, without a thawing or proofing step or, when traditionally required, a frying step. It is thus believed that the glaze on the dough's surface additionally acts to keep the outer surface of the dough malleable, therefore delaying the setting of the outer dough structure. In this manner, the outer surface continues to expand as the inner dough is heated, resulting in the observed enhanced dough geometry.

Thus, the application of the glaze of the present invention to dough products that heretofore required a frying step can eliminate the need for such a frying step. As used herein, "frying" includes deep-frying, a cooking method that is used on such products as frozen pizza crusts, doughnuts, beignets, tortillas, and the like. Additionally, "frying" indicates pan-frying in more limited amounts of oil prior to baking which also provides a crisp surface crust to the dough. Examples of products prepared in this manner include pizzeria pizzas, focaccia bread, and crumpets.

Additionally, because the presence of additional oil on the surface of the glazed dough allows the surface to remain malleable, the dough can expand further during baking than is achieved when baking an unglazed dough product. Thus, not only does glazing permit the elimination of the frying step altogether, but glazing also provides a larger final baked product, i.e., a balked product with increased horizontal dimensions, than is attained if the same dough product is baked unglazed.

Thus, the present invention provides a method of producing a baked product with increased horizontal dimensions over that which would be expected based on the dimensions of the unbaked dough product. Specifically, the method comprises the application of the aforementioned glaze to the surface of a dough product prior to baking. The glaze may be applied to a fresh dough product that is to be frozen (i.e. stored at 0° F. or below), an unbaked dough product that is already frozen, or a refrigerated (i.e., stored at from about 35° to about 40° F.) dough product.

EXAMPLE 1

Glaze Formulations

Tables 1, 2 and 3 list the composition of the glazes utilized in example 2–4, hereinbelow.

TABLE 1

"Original" Pizza Glaze Formula

| Ingredient | Percent (%) | Weight (g) |
| --- | --- | --- |
| Sodium stearoyl lactylate | 0.6 | 6 |
| Water | 67.4 | 674 |
| Starch | 2.0 | 20 |
| Canola Oil | 30.0 | 300 |

TABLE 2

Modified Pizza Glaze Formula (Added Dextrose)

| Ingredient | Percent (%) | Weight (g) |
| --- | --- | --- |
| Sodium stearoyl lactylate | 0.6 | 6 |
| Water | 64.4 | 644 |
| Starch | 2.0 | 20 |
| Canola Oil | 30.0 | 300 |
| Dextrose | 3.0 | 30 |

TABLE 3

Olive Oil Pizza Glaze Formula

| Ingredient | Percent (%) | Weight (g) |
| --- | --- | --- |
| Sodium stearoyl lactylate | 0.6 | 6 |
| Water | 64.4 | 644 |
| Starch | 2.0 | 20 |
| Canola Oil | 30.0 | 300 |
| Dextrose | 3.0 | 30 |

All of the aforementioned glaze formulations were prepared in the same general manner. Specifically, the above glazes were formulated by weighing out the water and adding it to the blender. The oil and sodium stearoyl lactylate (SSL) were then weighed, combined and warmed while mixing until the SSL was dissolved in the oil. The blender was turned on to the lowest setting, the dry ingredients were added to the vortex, and were mixed for about 15–30 seconds. With the blender still on the lowest setting, the oil/SSL mixture was added to the vortex. The glaze was mixed about 15–30 seconds or until an emulsion formed. The emulsion glaze was then stored in the cooler (about 40° F.) until use, for up to 1 week.

EXAMPLE 2

General Methods of Pizza Crust Formulation

Tables 4 and 5 list the composition of the doughs utilized in examples 3–4, hereinbelow.

TABLE 4

Pizza Dough Formula With Sponge

| Ingredient | Total % | Sponge Weight (g) | Dough Weight (g) |
| --- | --- | --- | --- |
| Flour | 62.37 | 200 | 1359 |
| Water | 32.10 | 200 | 602 |
| DATEM[a] | 0.10 | | 3 |
| Salt | 0.93 | | 23 |
| Canola Oil | 1.00 | | 25 |
| Sucrose | 1.00 | 12.5 | 12.5 |
| Yeast | 2.50 | 63 | |

[a]DATEM = diacetyl tartaric acid esters of monoglycerides

TABLE 5

Pizza Dough Formula Without Sponge

| Ingredient | Total % | Dough Weight (g) |
| --- | --- | --- |
| Flour | 62.66 | 1567 |
| Water | 32.25 | 806 |
| DATEM[a] | 0.10 | 3 |
| Salt | 0.93 | 23 |
| Canola Oil | 1.00 | 25 |
| Butter Flavor | 0.06 | 2 |
| Sucrose | 0.50 | 13 |
| Yeast | 2.5 | 63 |

[a]DATEM = diacetyl tartaric acid esters of monoglycerides

Sponge Preparation

Yeast (63 g), 8% of the water, 8% of the flour and half of the sugar were mixed together and the resulting sponge was allowed to ferment for 1 hour at room temperature.

Crust Preparation

Both of the aforementioned dough formulations were prepared in the same general manner. Specifically, the above doughs were prepared by weighing out the dry ingredients and adding them to a mixing bowl. The sponge and/or dry ingredients were then added. followed by the remaining water. The dough was mixed on speed 1 for 30 seconds. The oil was then added and the dough mixed on speed 1 for another 30 seconds, and then on speed 2 for 10 minutes.

The dough was rolled out to a thickness that would give about 142±10 grams for the deep dish style pizza crusts and 6" pizza crusts and 400±10 grams for the 12" pizza crusts. The pizza crusts were then cut from the rolled out dough using a pizza crust cutter and placed in pans. The pans were then covered with plastic separators and the crusts were allowed to proof for about 10 minutes. The crusts were stamped with a floured platen to form an edge on the crusts, and then docked, i.e., 1/32" diameter holes were punched in the dough at ½" intervals.

To make the 6" and deep dish crust, a 5½" diameter platen was used. To make a 12" crust, a 10½" diameter platen was used. To make a 12" inch crust with a rolled edge, after forming the edge with the platen, the edge was wetted with water, folded and then pinched to form a lip.

Freezing

After the crusts were formed, all sizes of crusts were then placed in a blast freezer (−40° F.) and allowed to freeze for about 30 minutes. The crusts were then removed from the pans and sealed in plastic freezer bags. The crusts were then stored in a 0° F. freezer overnight.

Glazing

The edges of the pizza crusts were brushed with the glaze (Example 1) and the crusts placed in a −10° F. freezer for about 2 hours. After this time, the crusts were placed in zip-lock freezer bags and stored in a 0° F. freezer until used.

Baking (6" and both 12")

A flat pizza pan was sprinkled with cornmeal and the frozen crusts placed on the pan. Sauce was spread on the crust followed by cheese, and any other desired toppings. The pizzas were then placed in either a cool or preheated oven and baked at 425° F. until golden brown. Alternatively, some of the pizzas were baked in an impingement oven at 500° F. for 6 minutes and 45 seconds.

Baking (Deep Dish)

A pizza pan was coated with 5 grams of oil and a frozen crust placed in the pan. Sauce was spread on the crust followed by cheese, and any other desired toppings. The pizzas were then placed in an impingement oven at 500° F. for 6 minutes and 45 seconds.

EXAMPLE 3
Glazed Pizza Crust vs. Unglazed Pizza Crust

Three 6" pizza crusts were glazed with the pizza glaze described in Table 1, Example 1 as follows: 1) glazed just the edge, 2) glazed the edge and the bottom, 3) glazed the top, bottom and edge. These pizzas were compared to a 6" pizza using a pizza crust that was not glazed (control). All pizzas were baked as described in Example 2.

All of the glazed pizzas had a longer diameter than the control pizza. The edges of the glazed pizza crusts were more tender and had a fried texture compared to the pizza crust edge that was not glazed.

Furthermore, two 12" pizzas were baked in an impingement oven as described above in Example 2. One crust was glazed with 93 grams of the original glaze and the other crust was not glazed. Both of the crusts had a rolled edge. The glazed pizza crust had a more golden color and still had a tender edge and crisp fried texture.

EXAMPLE 4
Glazed Pizza Crusts Increase in Area

A 12" pizza was baked in a hot conventional lab oven as described above (See Example 2). The crust had a straight edge and was not glazed. The area increased by about 13%. In contrast, a glazed 12" pizza crust (110 g of original glaze were applied to this crust) with a straight edge was baked in a hot conventional lab oven as described above. Example 2. The area increased by about 32%. The edge of the glazed pizza crust was more tender and had a fried texture compared to the unglazed pizza crust.

EXAMPLE 5
Quantification of the Relationship of the Amount of Glaze to the Increase in Area upon Baking of Frozen Pizza Crusts Seven 6" diameter frozen pizza crusts were produced as described in Example 2. They were coated with different amounts of the emulsion glaze described in Table 2. The pizzas were then topped with sauce and cheese and baked in a conventional oven that has been preheated to 425° F. The diameter of the crusts were measured both before and after baking and the change in area was calculated. The results are shown in FIG. 1. Briefly, it was found that as the amount of glaze increased from 0% to 10%, the baked diameter increased in relation to the amount of the glaze, but that further amounts of glaze had no additional effect on the diameter.

In summary, the experimental results show that the glaze of the present invention gives a pre-proofed pizza crust a fried texture without actually subjecting it to a traditional frying step. The oil emulsion glaze is of sufficient viscosity that it stays on the pizza crust edge and effectively fries the crust during baking. The fried texture can be observed when using either a conventional lab oven or an impingement oven. The present glaze can also cause an increase in total area when it is baked in a conventional lab oven.

All publications, patents and patent documents are incorporated by reference herein, as though individually incorporated by reference. The invention has been described with reference to specific and preferred embodiments and techniques. However, it should be understood that many variations and modifications may be made while remaining within the spirit and scope of the invention. Specifically, while the glaze of the present invention has been described and exemplified herein as being capable of increasing the horizontal dimensions of an unbaked dough product upon baking, the glaze can be effective to increase other dimensions, the baked specific volume and/or the cross-sectional area of dough products under conditions available to the art worker.

What is claimed is:

1. A shaped, unbaked, dough product having a fried texture imparting glaze coated on at least an exposed surface thereof, said fried texture imparting glaze comprising an oil-in-water emulsion incorporating about 20 to about 90% water, about 10 to about 80% edible oil, and about 0.1% to about 15% of an edible hydrophilic colloid.

2. The dough product of claim 1 wherein the fried texture imparting glaze is applied in an amount that is from about 3 to about 10% of the weight of the dough product.

3. The dough product of claim 1 wherein the dough is frozen.

4. The dough product of claim 1 wherein the dough is refrigerated.

5. The dough product of claim 1 wherein the dough is fresh.

6. The dough product of claim 1 wherein the dough is pizza crust, pizza roll, pizza pocket, doughnut, beignet, tortilla, focaccia bread, buñuelo, or crumpet dough.

7. The dough product of claim 6 wherein the dough is pizza crust or tortilla dough.

8. The dough product of claim 1 wherein the fried texture imparting glaze has a viscosity of from about 1,000 to about 100,000 centipoise.

9. The dough product of claim 1 wherein the hydrophilic colloid is pre-gelatinized starch, natural gum, a chemically-modified polysaccharide or mixtures thereof.

10. The dough product of claim 9 wherein the hydrophilic colloid comprises pre-gelatinized starch.

11. The dough product of claim 1 wherein the fried texture imparting glaze further comprises an effective amount of an emulsifier.

12. The dough product of claim 11 wherein the emulsifier is sodium stearoyl lactylate.

13. The dough product of claim 1 wherein the glaze further comprises a reducing sugar.

14. The dough product of claim 13 wherein the reducing sugar comprises maltose, isomaltose, cellobiose, lactose, melibiose, gentiobiose, rutinose, fructose or dextrose or a combination thereof.

15. The dough product of claim 14 wherein the reducing sugar is dextrose.

16. A method of imparting a fried surface texture to a baked dough product comprising coating a shaped, unbaked dough product on at least an upper, exposed surface thereof with a fried texture imparting glaze comprising an oil-in-water emulsion incorporating about 20 to about 90% water, about 10 to about 80% oil, and about 0.1% to about 15% of an edible hydrophilic colloid, wherein said fried texture imparting glaze has a viscosity of from about 1,000 to about 100,000 centipoise; and baking said unbaked dough product.

17. The method of claim 16 wherein said baked dough product is a pizza crust, a pizza roll, a pizza, a doughnut, a beignet, a tortilla, focaccia bread, a buñuelo, or a crumpet.

18. The method of claim 17 wherein said baked dough product is a pizza crust or a tortilla.

19. The method of claim 16, which does not comprise a frying step prior to baking.

20. The method of claim 16, further comprising freezing said unbaked dough product prior to baking.

21. The method of claim 20, which does not comprise a thawing step prior to baking.

22. A fried texture imparting glaze for an unbaked dough product comprising an oil-in-water emulsion incorporating about 20 to about 90% water, about 10 to about 80% edible oil, about 0.1% to about 15% of an edible hydrophilic colloid, and an effective amount of an emulsifier, wherein said glaze has a viscosity of from about 1,000 to about 100,000 centipoise.

23. The fried texture imparting glaze of claim 22 wherein the hydrophilic colloid is pre-gelatinized starch, natural gum, a chemically-modified polysaccharide or mixtures thereof.

24. The fried texture imparting glaze of claim 23 wherein the hydrophilic colloid comprises pre-gelatinized starch.

25. The fried texture imparting glaze of claim 22 wherein the emulsifier is sodium stearoyl lactylate.

26. The fried texture imparting glaze of claim 22 further comprising a reducing sugar.

27. The fried texture imparting glaze of claim 26 wherein the reducing sugar is maltose, isomaltose, cellobiose, lactose, melibiose, gentiobiose, rutinose, fructose or dextrose.

28. The fried texture imparting glaze of claim 27 wherein the reducing sugar is dextrose.

29. A method of increasing the horizontal dimensions of a baked dough product over the dimensions of a corresponding unglazed baked dough product comprising coating a shaped, unbaked dough product on at least an exposed surface thereof with a fried texture imparting glaze comprising about 20 to about 90% water, about 10 to about 80% oil, and about 0.1% to about 15% of an edible hydrophilic colloid, wherein said fried texture imparting glaze has a viscosity of from about 1,000 to, about 100,000 centipoise; and baking said unbaked dough product.

30. The method of claim 29 wherein said baked dough product is a pizza crust, a pizza roll, a pizza, a doughnut, a beignet, a tortilla, focaccia bread, a buñuelo, or a crumpet.

31. The method of claim 30 wherein said baked dough product is a pizza crust or a tortilla.

32. The method of claim 29, which does not comprise a frying step prior to baking.

33. The method of claim 29, further comprising freezing said unbaked dough product prior to baking.

34. The method of claim 33, which does not comprise a thawing step prior to baking.

* * * * *

UNITED STATES PATENT AND TRADEMARK OFFICE
CERTIFICATE OF CORRECTION

PATENT NO. : 5,989,603
DATED : November 23, 1999
INVENTOR(S) : Lonergan et al.

It is certified that error appears in the above-identified patent and that said Letters Patent is hereby corrected as shown below:

Column 10, line 35, after "the" and before "glaze"
insert --fried texture imparting--

Signed and Sealed this

Fifth Day of September, 2000

Attest:

Q. TODD DICKINSON

*Attesting Officer*

*Director of Patents and Trademarks*